United States Patent [19]
Robinson

[11] 4,310,277
[45] Jan. 12, 1982

[54] APPARATUS FOR TRANSFERRING CARGO BETWEEN RELATIVELY MOVABLE BODIES

[76] Inventor: James S. Robinson, 410 Flag Lake Dr., Lake Jackson, Tex. 77566

[21] Appl. No.: 128,445

[22] Filed: Mar. 10, 1980

[51] Int. Cl.³ .................................. B65G 67/62
[52] U.S. Cl. .................... 414/139; 212/191; 212/192; 212/257
[58] Field of Search .................. 414/137–139; 212/190–194, 257

[56] References Cited

U.S. PATENT DOCUMENTS 350,501 10/1886 Price ........................ 414/139 X
353,083 11/1886 Reid ........................ 212/190 X
2,000,054 5/1935 Weeks ........................ 212/190

FOREIGN PATENT DOCUMENTS 2517332 4/1974 Fed. Rep. of Germany ...... 414/139

Primary Examiner—Robert W. Saifer
Attorney, Agent, or Firm—Pravel, Gambrell, Hewitt, Kirk, Kimball & Dodge

[57] ABSTRACT

An apparatus for transferring cargo between first and second bodies which are movable relative to each other where a hoist for raising and lowering cargo through a hoist line is mounted on one of the bodies includes a linkage for connecting the two bodies. The linkage is pivotally connected to the bodies for accommodating relative movement between the bodies. A guide is located between the hoist line and one of the bodies for engaging and guiding the hoist line. A trolley which is movable along at least a portion of the linkage engages the hoist line on the side opposite the guide and moves the hoist line along the linkage between the guide and the other body while the line changes length so that cargo connected to the hoist line can be moved along the linkage.

13 Claims, 2 Drawing Figures

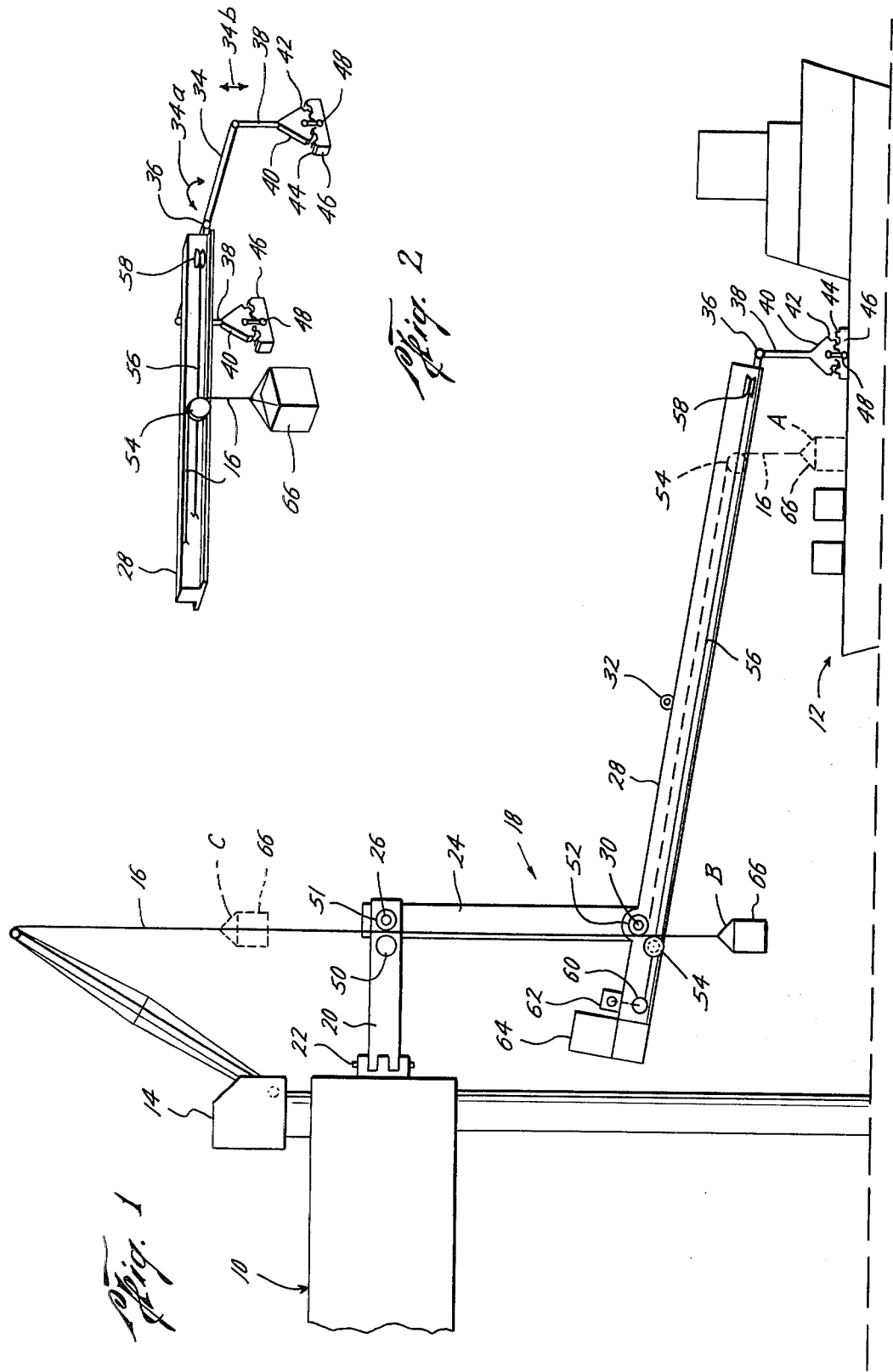

APPARATUS FOR TRANSFERRING CARGO BETWEEN RELATIVELY MOVABLE BODIES

TECHNICAL FIELD

This invention relates to marine cranes and, more particularly, to an apparatus used in conjunction with a marine crane for compensating for the relative movement caused by wave motion when cargo is transferred between a vessel and a stationary body such as an offshore drilling platform or dock.

The relative movement caused by wave motion between a vessel and a stationary body such as an offshore drilling platform or dock can create hazardous conditions during loading and unloading operations. This is especially true in less than ideal weather conditions. Unless some compensation is made for the relative movement between the two bodies the risk of bodily injury to crew members and damage to the crane, vessels or cargo is oftentimes unacceptably high.

BACKGROUND ART

A device for transferring heavy loads at sea is disclosed in U.S. Pat. No. 3,945,508 where a device for connecting two ships employs an inverted V-shaped cargo boom having one leg mounted on each ship. With such arrangement, however, transfers can only occur during periods of calm seas.

U.S. Pat. Nos. 3,428,194 and 4,027,800 are both directed to marine gantry cranes for handling carbon aboard ship while U.S. Pat. No. 3,757,678 is directed to a marine crane for handling logs. None of these patents deals with connecting two bodies to compensate for relative movement caused by wave motion.

A combined marine ramp transfer and mooring system is illustrated and described in U.S. Pat. No. 4,003,473. The ramp connects the two vessels so that personnel and/or material can travel between the two.

Trolley-type, high-line, transfer systems between ships are taught in U.S. Pat. Nos. 3,012,518 and 3,787,031 where a high-line cable is connected between ships so that cargo can be transferred.

Motion compensation systems for cranes and other cargo transfer equipment mounted on a vessel have been developed. In U.S. Pat. No. 4,021,019 a heave compensated crane is disclosed for holding a load at a fixed position and in U.S. Pat. No. 3,916,811 a tide compensation system for a vessel is disclosed.

Marine crane motion compensation systems are the subject of U.S. Pat. Nos. 3,591,022; 3,662,991; and 4,126,298 where under rough sea conditions a line connected to the cargo carrying surface of the other vessel in addition to a load carrying line ensures non-impact and precise placement of the cargo. Such a system can be supplemented with means to ensure that the cargo is lifted from the vessel at the wave crest of the relative motion cycle as disclosed in U.S. Pat. No. 4,025,055. Another motion compensator is taught in U.S. Pat. No. 4,174,188 where a supplemental cargo support is mounted on the deck of a vessel and is raised or lowered at an appropriate time for compensating for wave motion.

DISCLOSURE OF THE INVENTION

An apparatus is provided in accordance with the present invention where cargo can be safely transferred between two bodies which are movable relative to each other such as an offshore drilling platform or dock and a vessel, or between a drilling ship and a vessel.

A linkage is connected between the two bodies which accommodates any relative movement between them. The linkage is made up of three arms, a first arm pivotally connected to one of the bodies to accommodate pivotal movement in a horizontal plane, a second being pivotally connected to the first arm at one end and to a third arm at the other end with relative pivotal movement through a vertical plane being accommodated at these latter two pivot points. The outer end of the third arm is connected to the other body through a frame with pivot connections between the arm and frame and the frame and vessel which accommodate movement between the body and the linkage.

While it is to be understood that the apparatus is applicable to two moving bodies, it is best described and illustrated using it between a stationary body, such as an offshore drilling platform, and a moving body, such as a supply vessel.

A marine crane or hoist on the stationary body has a hoist line which can be moved into and out of engagement with a guide pulley connected to the linkage. A trolley in the form of a movable pulley connected to an endless line extending between two stationary rotatable pulleys which are mounted on the third arm engages the hoist line on the side opposite where it engages the guide pulley. Movement of the trolley back and forth along the third arm in cooperation with either the reeling in or playing out of the hoist line respectively, depending on whether the hoist line is moving away from or toward the vessel, will operate to move the hoist line and transfer cargo connected to the hoist line along the third arm.

The linkage provides a physical connection between the two bodies and operates as a stable guide for the cargo by compensating for relative movement between them. Utilization of a guide pulley and the trolley in the form of a movable pulley for engaging the hoist line provide a path for the cargo to a point where it can either be lifted vertically away from the influence of the moving vessel or deposited onto the deck of the vessel. Connection of the hoist line to the linkage through the pulleys where the linkage operates as an extension of the deck of the moving vessel allows cargo to be lifted from or deposited on the deck with a minimum of relative movement between the hoist line and deck.

In this way cargo is maintained under control both during the lifting and depositing phases of the operation as well as during transfer from the vessel to the stationary body and vice-versa even under less than ideal weather conditions. There is little danger of the connection between the two bodies breaking since the pivot points of the linkage and its connections to the two bodies compensate for all motions imparted by waves to the vessel. The cargo can be safely transferred between the deck of the vessel and a point where it is beyond the influence of wave motion.

BRIEF DESCRIPTION OF THE DRAWINGS

FIG. 1 is a side view of a marine crane and linkage for connecting two relatively movable bodies and transferring cargo between them; and FIG. 2 is a perspective view of the frame for connecting the linkage and vessel.

BEST MODE FOR CARRYING OUT THE INVENTION

Referring to FIG. 1, reference numeral 10 designates a stationary body such as, for example, an offshore drilling platform and reference numeral 12 designates a movable body such as, for example, a floating vessel. A suitable lifting means such as a marine crane or hoist 14 is mounted on the platform 10 and includes a hoist line 16 which can be raised and lowered in a way which is known to one with ordinary skill in the art.

During cargo transferring operations the platform 10 is physically connected to the vessel 12 through a linkage which is generally designated by reference number 18. The linkage 18 includes a first arm 20 which is connected to the platform 10 through a pivot pin 22 which will enable the arm 20 to pivotally move relative to the platform 10 through a horizontal plane. A second arm 24 is connected at one end to the first arm 20 through a pivot pin 26 and a third arm 28 is connected to the other end of the second arm 24 through a pivot pin 30, the pivot pins 26 and 30 allowing the second and third arms 24 and 28, respectively, to pivotally move through a vertical plane. The third arm 28 includes a ring 32 which can be engaged by a hook (not shown) on the end of the hoist line 16 for moving the linkage arrangement 18 into position.

The outer end of the third arm 28 is connected to the vessel 12 through a frame shown best in FIG. 2 which includes a cross-piece 34 which is connected to the outer end of the third arm 28 through a pivot connection 36 which enables the cross-piece 34 both to rotate as shown by arrow 34a and to rock up and down as shown by arrow 34b relative to the third arm 28. A pair of legs 38 are connected to the cross-piece 34 which include base portions 40 formed with gear teeth 42 on their lower end. The gear teeth 42 are convexly curved and mesh with gear teeth 44 formed on cooperating base pads 46 rigidly mounted on the deck of the vessel 12 to provide a rack and pinion arrangement. The base portion 40 is connected to the pad 46 through an appropriate link arrangement generally designated by reference numeral 48 which allows limited relative movement between the gears. The combination of the pivotal movement capabilities provided by the arm connections and the rocking motion of the meshing gears 42 and 44 will accommodate any movement of the vessel 12 relative to the platform 10 caused by wave motion without causing undue stress in any portion of the linkage or its connections. The pivot pin 22 accommodates lateral motion of the vessel 12 as it is shown in FIG. 1 relative to the platform 12 while the pivot pins 26 and 30 and the gears 42 and 44 accommodate longitudinal and vertical movement caused by heaving, pitching or surging of the vessel 12. The pivot connection 36 also accommodates any rolling action of the vessel 12 by allowing the cross-piece 34 to rock relative to the third arm 28. While not shown in FIG. 2, it is to be understood that the base pads 46 can be designed to be movable on the deck of the vessel, so that exact placement of the cargo on the deck can be made when the trolley is fully extended, thereby reducing any relative motion between the deck of the vessel 12 and the cargo 66 to a minimum. It is also to be understood, while not illustrated, that the apparatus can be installed on the vessel and means provided to temporarily attach it to the stationary body for transfer. It is also to be understood that the apparatus is not limited to transferring between a stationary body and a movable body, but because of the pivotal aspects of the apparatus, between two movable bodies such as a drill ship or floating dock and a supply vessel. It is further to be understood that arms 20, 24 and 28 can be fabricated in a manner which will allow them to be extended or retracted, thereby permitting the apparatus to be adjusted for differences in height between the two bodies, because of sea conditions or because of lateral distance between the two bodies. It is also to be understood, although not illustrated, that the apparatus can be fabricated with walkways and ladders to provide for the transfer of personnel, and with hose connections to provide for the transfer of liquid cargos.

A pair of stationary guide pulleys 50 and 51, which are spaced apart a distance sufficient so that the hoist line 16 can move between them, are mounted on the first arm 20 as shown in FIG. 1. A third stationary guide pulley 52 is mounted on the pivot point 30 directly below the pulley 51. A trolley mechanism is provided on the third arm 28 in the form of a movable pulley 54 which is connected to an endless line 56 that extends between a pair of stationary pulleys 58 and 60 located at the opposite ends of the arm 28. An appropriate motor 62 is mounted for rotating the pulley 60 for moving the movable pulley 54 back and forth along the third arm 28 for effecting the cargo transferring operation as described in greater detail below. A counterweight 64 can be mounted on the end of the arm 28 opposite the end connected to the vessel 12.

In order to transfer cargo from the vessel 12 to the platform 10 the hoist line 16 is first lowered and then positioned between the guide pulleys 50 and 52 and in contact with the rotatable pulley 54, all of which are located on the same side of the linkage 18. The hoist line 16 is played out in cooperation with movement of the pulley 54 along the third arm 28. Engagement between the pulley 54 and the hoist line 16 operates to move the hoist line along the third arm 28 until it reaches a point shown by the broken lines and designated by the letter A over a cargo container 66 which is to be transferred to the platform 10.

The end of the hoist line 16 is appropriately connected to the container 66 while the movable pulley 54 remains in engagement with the hoist line 16. The hoist line 16 is then reeled in to clear the deck of the vessel 12 and any other objects in the way. Engagement of the hoist line 16 with the third arm 28 which is in effect an extension of the vessel 12 effectively minimizes any relative movement between the hoist line 16 and vessel 12 so that the cargo container 66 can be safely lifted regardless of wave motion imparted to the vessel.

The movable pulley 54 is moved back along the third arm 28 as the hoist line 16 is appropriately reeled in to where the hoist line 16 is vertical and the cargo container 66 is in the position indicated by letter B. The cargo container 66 is always under control regardless of vessel movement because of engagement of the hoist line by the respective pulleys.

After position B is reached, the hoist 14 is moved laterally away from the linkage 18 so that the hoist line 16 moves from between the guide pulleys 50 and 51 and out of engagement with the guide pulley 52 so that the cargo container 66 can be lifted toward the position shown by the broken lines and indicated by letter C. The hoist 14 can then be maneuvered to place the cargo container 66 on the deck of the platform 10. In order to transfer material from the deck of the platform 10 to the deck of the vessel 12, the operation just described can be reversed. Guides (not shown) can be attached near pivot pins 26 and 30 to facilitate proper placement of the load line 16 when the apparatus is moving because of wave action.

After cargo transfer operations cease, the linkage 18 is disconnected from the deck of the vessel 12 by disconnecting the links 48. A hook (not shown) on the hoist line 16 which connects with the ring 32 can swing the linkage 18 about the pivot pin 22 and out of the way. The arms 24 and 28 can be fabricated with telescoping sections (not shown) or with appropriate hinges (not shown) for either collapsing or folding the arms and reducing the overall size of the linkage arrangement 18 for more convenient storage.

In this way cargo can be transferred from the deck of a vessel onto a platform or vice-versa even during rough seas because continuous physical contact is maintained between the two bodies and compensation can be made for the relative motion of the vessel caused by wave motion by maintaining contact between the hoist line and a physical extension of the vessel. Cargo can safely and easily be hoisted and transferred because movement of the hoisting mechanism relative to the vessel is minimized through the connecting-compensating mechanism until the cargo is free from the influence of wave motion imparted to the vessel. Control is at all times maintained over the cargo so that it cannot break loose or swing wildly during the transfer operation. Thus, a safe and efficient way of transferring cargo between a vessel and a stationary body is provided.

The foregoing disclosure and description of the invention are illustrative and explanatory thereof, and various changes in the size, shape and materials as well as in the details of the illustrated construction may be made without departing from the spirit of the invention and all such changes are contemplated as falling within the scope of the appended claims.

I claim:

1. Apparatus for transferring cargo between first and second bodies which are movable relative to each other where a hoist for raising and lowering cargo through a hoist line is mounted on one of the bodies, the apparatus comprising linkage means for connecting the two bodies, pivot means for pivotally connecting the linkage means to the bodies and accommodating relative movement between the bodies, guide means located between the hoist line and one of the bodies for engaging and guiding the hoist line, and trolley means movable along at least a portion of the linkage means for engaging the hoist line on the side opposite the guide means and moving the hoist line along the linkage between the guide means and the other body while the line changes length so that cargo connected to the hoist line can be moved along the linkage means.

2. The apparatus of claim 1, wherein the first body is stationary and the second body is a vessel floating on water.

3. The apparatus of claim 1, wherein the linkage means includes a first arm pivotally connected to the first body for pivotal movement through a horizontal plane, a second arm pivotally connected to the first arm for pivotal movement through a vertical plane, and a third arm pivotally connected to the second arm for pivotal movement through a vertical plane.

4. The apparatus of claim 3, wherein the pivot means includes a frame with a cross-piece pivotally connected to the third arm for accommodating rotational and lateral rocking movement of the frame relative to the third arm, the frame further including a pair of legs connected at one end to the cross-piece and at the other end to the second body through cooperating gears for accommodating relative longitudinal movement between the third arm and second body.

5. The apparatus of claim 3, wherein the guide means includes a first rotatable pulley mounted on one side of the third arm.

6. The apparatus of claim 5, and further including a pair of rotatable guide pulleys spaced apart at least the diameter of the hoist line and mounted on the linkage means above the first pulley.

7. The apparatus of claim 3, wherein the trolley means includes a movable pulley connected to an endless line mounted between stationary rotatable pulleys located at both ends of the third arm and means for rotating one of the stationary pulleys.

8. Linkage arrangement for an apparatus for transferring cargo between first and second bodies which are movable relative to each other where a hoist for raising and lowering cargo through a hoist line is mounted on one of the bodies, the linkage including a plurality of arms, pivot means for connecting the arms to each other and to the respective bodies for accommodating relative movement between the bodies, guide means mounted on one of the arms between the hoist line and one of the bodies for engaging and guiding the hoist line, and trolley means movable along at least a portion of the linkage means for engaging the hoist line on the side opposite the guide means and moving the hoist line along the linkage between the guide means and the other body while the line changes length so that cargo connected to the hoist line can be moved along the linkage means.

9. The linkage arrangement of claim 8, wherein the linkage includes a first arm pivotally connected to the first body for pivotal movement through a horizontal plane, a second arm pivotally connected to the first arm for pivotal movement through a vertical plane, and a third arm pivotally connected to the second arm for pivotal movement through a vertical plane.

10. The linkage of claim 9, wherein the pivot means includes a frame with a cross-piece pivotally connected to the third arm for accommodating rotational and lateral rocking movement of the frame relative to the third arm, the frame further including a pair of legs connected at one end to the cross-piece and at the other end to the second body through cooperating gears for accommodating relative longitudinal movement between the third arm and second body.

11. The linkage of claim 9, wherein the guide means includes a first rotatable pulley mounted on one side of the third arm.

12. The linkage of claim 11, and further including a pair of rotatable guide pulleys spaced apart at least the diameter of the hoist line and mounted on the linkage above the first pulley.

13. The linkage of claim 9, wherein the trolley means includes a movable pulley connected to an endless line mounted between stationary rotatable pulleys located at both ends of the third arm and means for rotating one of the stationary pulleys.

* * * * *